US005288294A

United States Patent [19]

Käser

[11] Patent Number: 5,288,294

[45] Date of Patent: Feb. 22, 1994

[54] PROCESS FOR DYEING PAPER WITH DISAZO DYES

[75] Inventor: Adolf Käser, Bottmingen, Switzerland

[73] Assignee: Ciba-Geigy Corporation, Ardsley, N.Y.

[21] Appl. No.: 949,179

[22] Filed: Sep. 21, 1992

[30] Foreign Application Priority Data

Sep. 26, 1991 [CH] Switzerland ...................... 2852/91-9

[51] Int. Cl.$^5$ ...................... C09B 31/00; C09B 31/02; D21H 21/28

[52] U.S. Cl. ........................................... 8/687; 8/681; 8/919

[58] Field of Search ............................ 8/681, 687, 919

[56] References Cited

U.S. PATENT DOCUMENTS

| | | | |
|---|---|---|---|
| 2,993,038 | 7/1961 | Fasciati et al. | 8/549 |
| 4,988,805 | 1/1991 | Kunde | 534/717 |
| 5,034,017 | 7/1991 | Kunde et al. | 8/681 |
| 5,049,238 | 9/1991 | Käser | 162/160 |

FOREIGN PATENT DOCUMENTS

| | | |
|---|---|---|
| 354872 | 2/1990 | European Pat. Off. . |
| 60-156759 | 8/1985 | Japan . |
| 168743 | 9/1985 | Japan . |
| 320752 | 5/1957 | Switzerland . |
| 733361 | 7/1955 | United Kingdom . |

OTHER PUBLICATIONS

C.A. 104: 70283j (1986).

*Primary Examiner*—Paul Lieberman
*Assistant Examiner*—Caroline L. Dusheck
*Attorney, Agent, or Firm*—Kevin T. Mansfield; George R. Dohmann

[57] ABSTRACT

The dyes of formula (1)

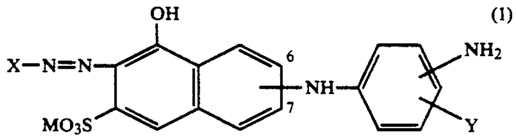

wherein X, Y and M are as defined in claim 1, are suitable for dyeing paper with good lightfastness.

10 Claims, No Drawings

PROCESS FOR DYEING PAPER WITH DISAZO DYES

Disazo dyes often used for dyeing paper in blue shades. If it is desired that the dyeings shall have superior lightfastness properties, then nearly solely copper complexes of dyes are used in practice. Recently, for economic and environmental reasons there has been a search for lightfast blue paper dyes which do not contain copper complexes. However, such dyes are hardly known for greenish blue shades in particular.

It is the object of this invention to provide a process for dyeing paper in blue shades of good light fastness without using copper compounds. It has been found that this object is achieved by the invention process.

Accordingly, the present invention provides a process for dyeing paper, which comprises the use of a dye of formula

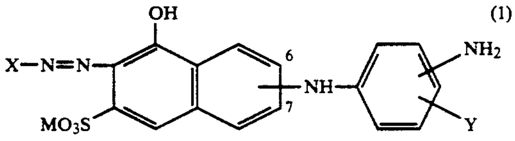

(1)

wherein

Y is sulfo or carboxy, and

X is a group of formula

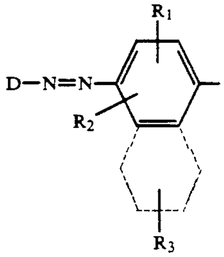

(2)

or

KK—N=N—B— (3)

wherein

D is the radical of an aromatic, carbocyclic or heterocyclic diazo component,

KK is a coupling component,

B is the radical of an aromatic diamine, $R_1$ is hydrogen, $C_1$-$C_4$alkyl or $C_1$-$C_4$alkoxy, —NH—CO—C—$C_1$-$C_4$ alkyl or —NH—CO—$NH_2$, $R_2$ is hydrogen, $C_1$-$C_4$alkyl or $C_1$-$C_4$alkoxy, sulfo or carboxy, $R_3$ is hydrogen, $C_1$-$C_4$alkyl, sulfo or carboxy, and M is hydrogen or the equivalent of a colourless cation, and Y and the free amino group at the phenylamino radical in formula (1) are ortho-positioned to each other, and said phenylamino radical is in 6- or 7-position, and with the proviso that D is the radical of 4-nitro-4'-aminostilbene-2,2'-disulfonic acid or 4,4'-diaminostilbene-2,2'-disulfonic acid.

It is preferred to use those dyes of formula (1), wherein Y is sulfo and the free amino group is in para-position to the —NH— group.

The diazo component D is preferably a phenyl or naphthalene radical which may be substituted by one or more of the customary radicals in dyestuffs chemistry, typically by sulfo, carboxy, halogen, hydroxy, nitro, cyano, alkyl, alkoxy, alkylcarbonylamino, phenylamino, arylazo, preferably phenylazo, phenylsulfonyl, phenylcarbonylamino or styryl, the phenyl moieties of which substituents may themselves carry the cited substituents.

Preferably D is an unsubstituted phenyl radical or a phenyl radical which is substituted by sulfo, carboxy, chloro, cyano, hydroxy, nitro, $C_1$-$C_4$alkyl or $C_1$-$C_4$alkoxy, phenylamino, phenylsulfonyl, phenylazo, phenylcarbonylamino or styryl, or is an unsubstituted naphthyl radical or a naphthyl radical which is substituted by sulfo, hydroxy or arylazo, preferably phenylazo, the phenyl moieties of which substituents are unsubstituted or substituted by sulfo.

$R_1$ is preferably hydrogen, methyl, methoxy or acetylamino, $R_2$ is preferably methyl or, more particularly, hydrogen, and $R_3$ is preferably sulfo or, more particularly, hydrogen.

Among the radicals of formula (2), radicals of formula

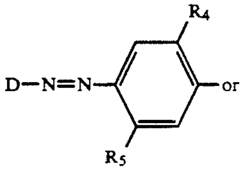

(4)

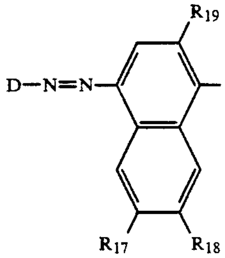

(4a)

are especially preferred, wherein

D is a phenyl radical which is substituted by sulfo, carboxy, chloro, cyano, hydroxy, nitro, $C_1$-$C_4$alkyl or $C_1$-$C_4$alkoxy, phenylamino, phenylsulfonyl, phenylazo, phenylcarbonylamino or styryl, or is a naphthyl radical which is substituted by sulfo, hydroxy or phenylazo, the phenyl moieties of which substituents are unsubstituted or substituted by sulfo, $R_4$ is hydrogen, methyl or methoxy, $R_5$ is hydrogen, methyl, methoxy or acetylamino, $R_{17}$ and $R_{18}$ are each independently of the other hydrogen or sulfo, and $R_{19}$ is hydrogen, methoxy or carboxymethoxy.

In the radical of formula (3), KK is a coupling component, typically a naphthol naphthylamine or diphenylamine which may be substituted, typically by sulfo, hydroxy, amino, acylamino, alkoxy, halogen, phenylamino or phenylcarbonylamino, the phenyl moieties of which substituents may in turn be substituted, typically by sulfo or amino.

Preferred coupling components are those of formula

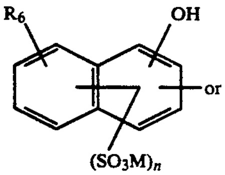 or (5)

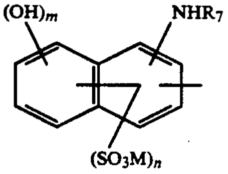 (6)

wherein $R_6$ is hydrogen, hydroxy, alkoxy, amino, alkanoylamino, phenylcarbonylamino or phenylamino, the phenyl moieties of which substituents may be substituted by sulfo, amino or alkanoylamino, n is 1 or 2, $R_7$ is hydrogen or phenylamino, M is hydrogen of the equivalent of a colourless cation, and m is 0 is 1.

B is the radical of an aromatic diamine, for example of a phenylenediamine of formula

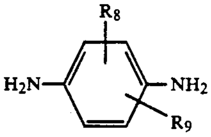 or of a diamine of formula (7)

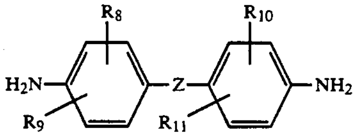 (8)

wherein $R_8$, $R_9$, $R_{10}$ and $R_{11}$ are each independently of one another hydrogen, $C_1$-$C_4$ alkyl or $C_1$-$C_4$ alkoxy, sulfo or carboxy, and Z is a direct bond or a customary linking group in the chemistry of direct dyes.

Suitable linking groups Z are typically:

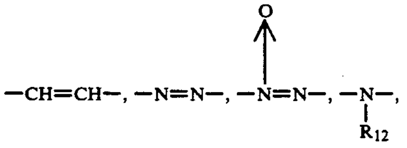

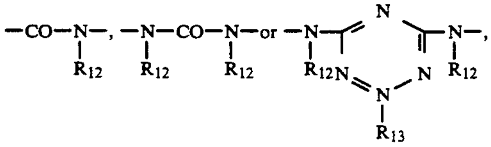

wherein each $R_{12}$ independently of the others is hydrogen or alkyl, and $R_{13}$ is chloro, alkoxy or

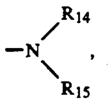 , wherein $R_{14}$ and $R_{15}$ are each independently of the other hydrogen, unsubstituted or substituted $C_1$-$C_6$alkyl or unsubstituted or substituted phenyl.

Preferred linking groups Z are —N=N—,

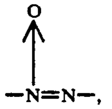

—CH=CH—, —NH—, —CO—NH—, —NH—CO—NH— or

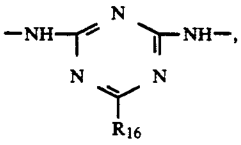 , wherein $R_{16}$ is 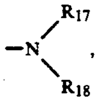 , and $R_{17}$ and $R_{18}$ are each independently of the other unsubstituted or substituted $C_1$-$C_6$alkyl. Among these linking groups, —CH=CH— and

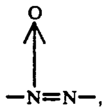

are especially preferred.

M is hydrogen or the equivalent of a colourless cation, typically lithium, sodium, potassium, ammonium or the protonated form of a $C_4$-$C_{12}$trialkylamine, $C_4$-$C_{12}$diamine or $C_2$-$C_{15}$alkanolamine.

M as a protonated $C_4$-$C_{12}$trialkylamine may be a protonated N-ethyldimethylamine, N,N-diethylmethylamine, tri-n-propylamine, tri-n-butylamine, triisobutylamine and, preferably, a triethylamine or triisopropylamine. Mixtures of different protonated amines are also suitable.

M as a protonated $C_4$-$C_{12}$diamine may be an ethylenediamine or 1,3-diaminopropane, one or both N-atoms of which are additionally substituted by one or two $C_1$-$C_4$alkyl radicals, preferably methyl or ethyl radicals. M is in this case preferably a N,N-dialkylethylenediamine or N,N-dialkyl-1,3-diaminopropane. Exemplary of such diamines are:

N-ethylethylenediamine, N,N-dimethylethylenediamine, N,N'-dimethylethylenediamine, N,N-diethylethylenediamine, 3-dimethylamino-1-propylamine or 3-diethylamino-1-propylamine.

M as a protonated $C_2$-$C_{15}$alkanolamine may be the protonated form of a monoalkanolamine, dialkanolamine, monoalkanolmonoalkylamine, monoalkanoldialkylamine, dialkanolalkylamine or trialkanolamine, or a mixture of different protonated alkanolamines. Typical examples are protonated 2-aminoethanol, bis(2-hydroxyethyl)amine, N-(2-hydroxyethyl)dimethylamine, N-(2-hydroyethyl)diethylamine, N,N-bis(2-hydroxyethyl)-methylamine, N,N-bis(2-hydroxyethyl)ethylamine or tris(2-hydroxyethyl)amine, 2-aminoethoxyethanol or diethylaminopropylamine. Protonated polyglycol amines are also suitable, for example diethanolamine trisglycol ether.

The preferred meaning of M is $Na^{\oplus}$, $Li^{\oplus}$ or protonated $C_4$-$C_6$alkanolamine, the preferred $C_4$-$C_6$alkanolamines being tris(2-hydroxyethyl)amine, bis(2-hydroxyethyl)amine or a mixture of these two amines.

Alkyl radicals will quite generally be understood as meaning straight-chain, branched or cyclic alkyl groups. Cycloalkyl contains preferably 5 to 8 carbon atoms, and open-chain alkyl preferably 1 to 8 carbon atoms.

Unbranched or branched open-chain alkyl may suitably be methyl, ethyl, n-propyl and isopropyl, n-, sec- or tert-butyl, n-pentyl and isopentyl, n-hexyl and isohexyl or 2-ethylhexyl.

These alkyl radicals may be substituted by one or more members selected from the group consisting of hydroxy, sulfo, carboxy, $C_1$-$C_4$alkoxy, hydroxy-substituted $C_1$-$C_4$alkoxy, phenyl, phenoxy and phenylaminocarbonyl, the phenyl moiety of which three last mentioned substituents may be substituted, e.g. by sulfo, $C_1$-$C_4$alkyl, $C_1$-$C_4$alkoxy or phenoxy. Suitable radicals of this kind may typically be hydroxyethyl, 1-hydroxyisopropyl, ethoxymethyl, 2-hydroxyethoxypentyl, benzyl, 1-phenylethyl, 2-phenylethyl, 1-methyl-2-phenylethyl, 1-isobutyl-3-phenylpropyl, 1,5-diphenylpentyl-3,1-methyl-2-phenoxyethyl or 1-methyl-2-phenylaminocarbonylethyl.

Cycloalkyl is preferably cyclopentyl and cyclohexyl. A suitable substituent is preferably $C_1$-$C_4$alkyl, more particularly $CH_3$.

Suitable alkoxy radicals are preferably those containing 1 to 4 carbon atoms, typically methoxy, ethoxy, propoxy, isopropoxy, n-butoxy, isobutoxy or tert-butoxy. These alkoxy radicals may be substituted, conveniently by the radicals cited as substituents of the alkyl groups.

Halogen will typically be fluoro, bromo, iodo or, preferably, chloro.

Throughout this specification, phenyl will be understood as meaning unsubstituted or substituted phenyl radicals. Exemplary of suitable substituents are $C_1$-$C_4$alkyl, $C_1$-$C_4$alkoxy, bromo, chloro, nitro, cyano, sulfo, carboxy or $C_1$-$C_4$alkylcarbonylamino.

A particularly preferred embodiment of the novel process comprises the use of a dye of formula

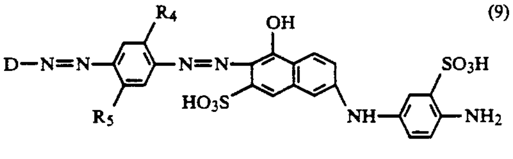

(9)

wherein D is a phenyl radical which is substituted by sulfo, carboxy, chloro, cyano, hydroxy, nitro, $C_1$-$C_4$alkyl or $C_1$-$C_4$alkoxy, phenylamino, phenylsulfonyl, phenylazo, phenylcarbonylamino or styryl, or is a naphthyl radical which is substituted by sulfo, hydroxy or phenylazo, the phenyl moieties of which substituents are unsubstituted or substituted by sulfo, and $R_4$ is hydrogen, methyl or methoxy, and $R_5$ is hydrogen, methyl, methoxy or acetylamino.

It is especially preferred to use a dye of formula (9), wherein D is a sulfophenyl radical which may additionally be substituted by chloro, nitro, methyl, methoxy or carboxy.

A further preferred embodiment of the novel dyeing process comprises the use of a dye of formula

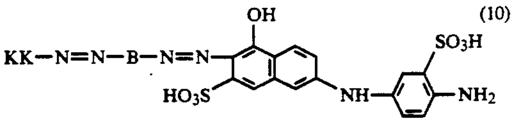

(10)

wherein

KK is a coupling component of formula

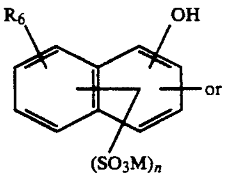

(5)

or

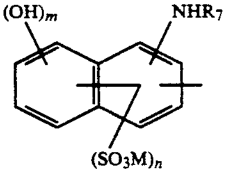

(6)

wherein $R_6$ is hydrogen, hydroxy, alkoxy, amino, alkanoylamino, phenylcarbonylamino or phenylamino, the phenyl moieties of which substituents may be substituted by sulfo, amino or alkanoylamino, n is 1 or 2, $R_7$ is hydrogen or phenylamino, M is hydrogen or the equivalent of a colourless cation, and m is 0 or 1 and B is the radical of a phenylenediamine of formula

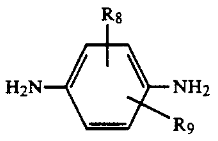

(7)

or of a diamine of formula

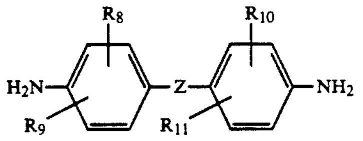

(8)

wherein $R_8$, $R_9$, $R_{10}$ and $R_{11}$ are each independently of one another hydrogen, $C_1$-$C_4$alkyl or $C_1$-$C_4$alkoxy, sulfo or carboxy, and Z is a linking group of formula —N=N—,

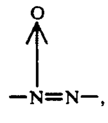,

—CH=CH—, —NH—, —CO—NH—, —NH—CO—NH— or

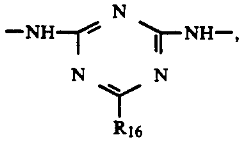

wherein $R_{16}$ is

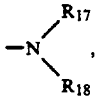

and $R_{17}$ and $R_{18}$ are each independently of the other unsubstituted or substituted $C_1$-$C_4$alkyl.

The dyes used in the novel process for dyeing paper are known or can be prepared in a manner known per se, conveniently by diazotising an amine of formula (11)

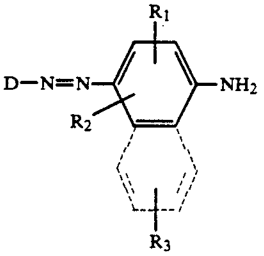

and coupling the diazonium salt so obtained to a coupling component of formula (12)

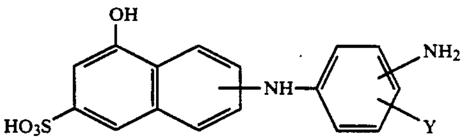

in which formulae D, $R_1$, $R_2$, $R_3$ and Y are as defined for formulae (1) and (2).

Another means or preparing dyes useful in the process of this invention comprises diazotising a diamine of formula $$H_2N—B—NH_2 \quad (13)$$

coupling to a coupling component KK, then diazotising the aminoazo dye so obtained, which is then coupled to a coupling component of formula (12). B and KK are as defined for formula (3).

The order of the coupling reactions can be also reversed by coupling first to a coupling component of formula (12) and subsequently to a coupling component KK. Depending on the type of the diamine of formula (13), it may advantageous to acylate one of the two $NH_2$ groups before the diazotisation or to start from a nitroamino compound and to reduce the nitro group to the amino group after the first coupling.

The dyes of formula (1) can be used in solid or liquid form for dyeing paper.

In powder or granular form the dyes are used preferably for batchwise mass dyeing in which the dye is added batchwise to the pulper, hollander or mixing chest. The dyes are preferably added as formulations which may contain the extenders, e.g. urea as solubiliser, dextrins, Glauber's salt, sodium chloride, as well as dispersants, dust inhibitors and chelating agents such as tetrasodium pyrophosphate.

The invention accordingly also relates to solid dye formulations for dyeing paper, which formulations contain dyes of formula (1).

In recent years the use of concentrated aqueous solutions of dyes has gained importance on account of the advantages which such solutions have over dyes in powder form. The use of solutions avoids the problems associated with dust formation, and the dyer is relieved of the time-consuming and often difficult operation of dissolving the dye powder in water. The use of dye solutions has, moreover, been promoted by the development of continuous processes for dyeing paper, as in such processes it is expedient to add the solution direct to the hollander or at any other suitable juncture in paper manufacture.

Hence the invention further relates to concentrated aqueous solutions of dyes of formula (1), which solutions contain not less than 10% by weight, typically 10 to 30% by weight, of dye, based on the total weight of the solution. The solutions preferably contain 10 to 20% by weight of dye.

Concentrated aqueous solutions of dyes of formula (1) can be prepared by filtering the dye suspension obtained in the synthesis of the dye, if appropriate effecting deionisation, conveniently by a membrane separation method, and stabilising the solution by the addition of auxiliaries such as urea, ε-caprolactam or polyethylene glycol. It is, however, also possible to suspend the isolated dye in hydrochloric acid, to filter the dye suspension once more and to mix the filter cake with lithium hydroxide or a suitable amine, typically an alkanolamine, and the requisite amount of water. Finally, it is also possible to carry out the coupling in the presence of LiOH, ammonia or alkanolamine, and to deionise the synthesis solution. Such dye solutions are suitable for dyeing paper pulp in the presence of rosin and alum size.

The dye solutions so obtained preferably contain, per 100 parts of dye in the form of the free acid, 400 to 900 parts of water, 0 to 200 parts of further auxiliaries such as urea, ε-caprolactam or polyethylene glycol, as well as sufficient base for the pH to be in the range from 7 to 10. Suitable bases are typically NaOH, LiOH, ammonia or organic amines, conveniently alkanolamines.

The novel aqueous concentrates, which are stable at storage temperatures of up to −5° C., are suitable for dyeing paper on which, with or without the use of a size, they give attractive blue shades.

Some of the dyes of formula (1) are already known, but their utility for dyeing paper has not been considered. Compared with the known blue copper-free paper dyes based on 1-hydroxy-7-anilinonaphthalene-3-sulfonic acid, the dyes of formula (1) used in the practice of this invention are distinguished by the feature that they give dyeings of enhanced lightfastness on paper.

The dyes can be used in the paper industry for all processes in which substantive dyes are customarily used, especially for mass as well as surface dyeing of sized and unsized paper, starting from bleached or unbleached pulp of different provenance, such as coniferous or deciduous sulfite and/or sulfate pulp.

The invention is illustrated by the following Examples in which parts and percentages are by weight.

EXAMPLE 1

36,6 parts of the aminoazo dye obtained by coupling diazotised 2-amino-5-nitrobenzolsulfonic acid with 2-methoxy-5-methylaniline in weakly acidic medium are mixed at 45° C. with a dispersant to a homogeneous suspension in 500 parts of water with aqueous sodium hydroxide at pH 7. After addition of 6.9 parts of sodium nitrite, the suspension is run into a mixture of 25 parts of hydrochloric acid (32%) and 50 parts of ice-water. The temperature is simultaneously kept at 30°-35° C., and the reaction suspension is stirred for 2-3 hours at this temperature until diazotisation is complete and then cooled to 10° C.

The diazo suspension is then run into a neutral solution of 45 parts of 2-(4'-amino-3'-sulfoanilino)-5-hydroxynaphthalene-7-sulfonic acid in 250 parts of water, while keeping the pH at 8-8.5 with 4N aqueous sodium hydroxide. The coupling mixture is stirred for 1 hour at room temperature and the dye is precipitated by addition of sodium chloride and isolated by filtration. In the form of the free acid it has the formula

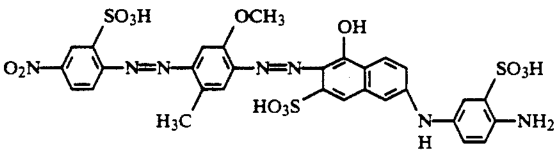

and dyes paper, cotton and leather in a pure reddish blue shade of good lightfastness.

EXAMPLES 2-99

The procedure of Example 1 is repeated, but using as aminoazo dye the dyes obtained by diazotising the diazo components of column 2 of the following Table and coupling to the middle components listed in column 3. Repeated diazotisation and coupling as described in Example 1 to the coupling components listed in column 4 gives azo dyes which dye paper in blue shades of good lightfastness.

In Examples 8 and 60, the amino group of the diazo component in meta-position to the sulfo group is diazotised after the amino group in ortho-position to the sulfo group has been protected beforehand by a protective group.

In accordance with the same general procedure, in Examples 85 and 93 one of the two amino groups is protected by a protective group and then the other amino group is diazotised.

In Example 24, the OH group of the diazo component must be protected by a protective group in conventional manner during the diazotisation. In Examples 81-83, the sulfo group of the diamine component is introduced by conventional sulfonation after the first coupling.

| Diazo component | Middle component | Coupling component |
|---|---|---|
| 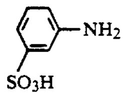 | 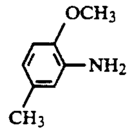 | 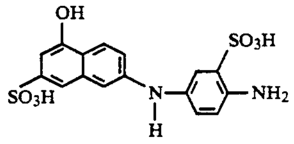 |
| 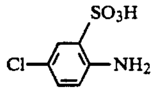 | 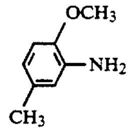 | 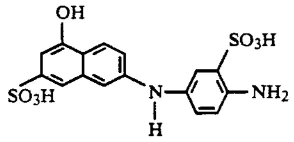 |
| 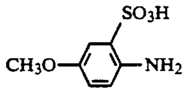 | 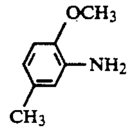 | 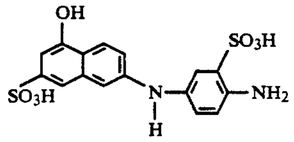 |
| 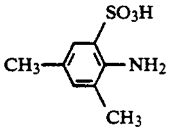 | 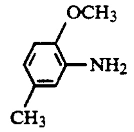 | 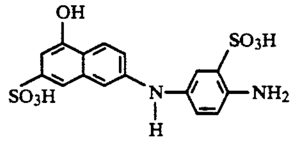 |
| 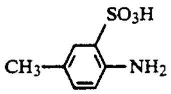 | 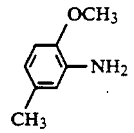 | 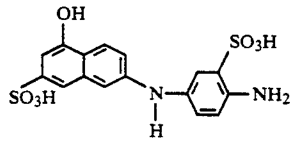 |

-continued
| Diazo component | Middle component | Coupling component |
|---|---|---|
| 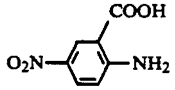 | 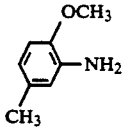 | 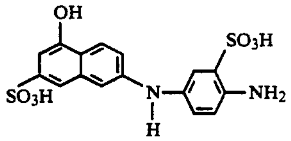 |
| 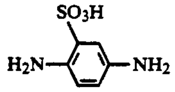 | 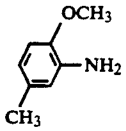 | 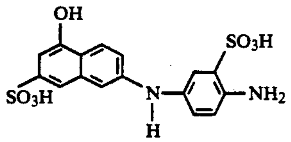 |
| 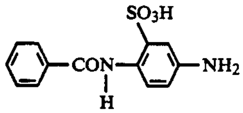 | 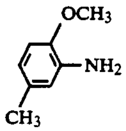 | 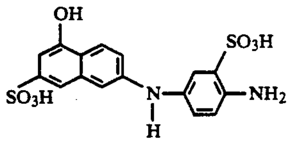 |
| 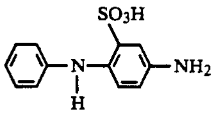 | 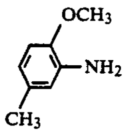 | 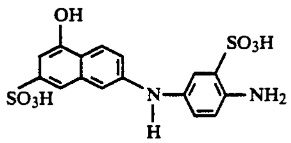 |
| 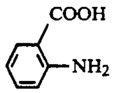 | 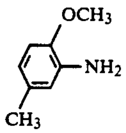 | 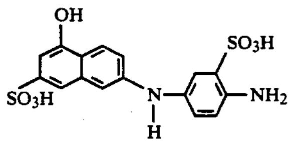 |
| 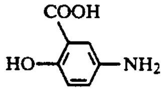 | 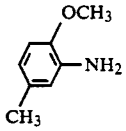 | 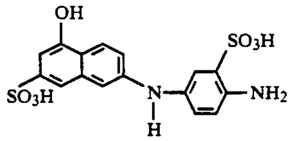 |
| 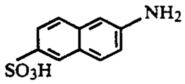 | 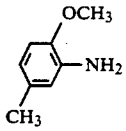 | 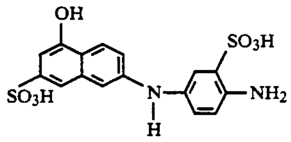 |
| 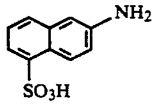 | 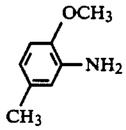 | 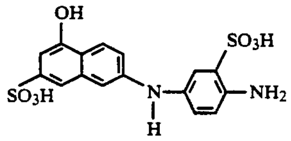 |
| 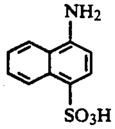 | 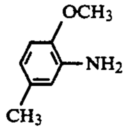 | 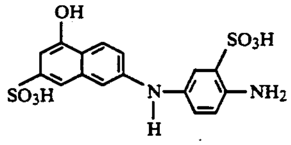 |
| 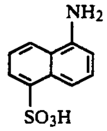 | 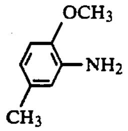 | 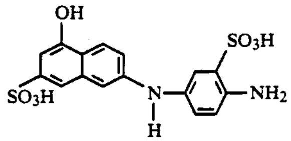 |

-continued
| Diazo component | Middle component | Coupling component |
|---|---|---|
| 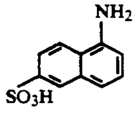 | 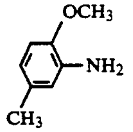 | 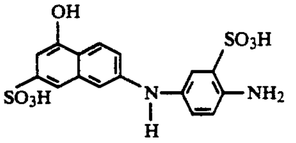 |
| 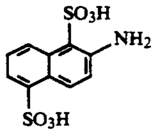 | 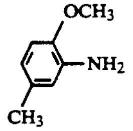 | 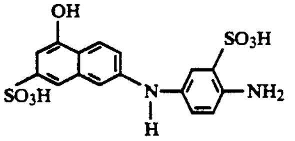 |
| 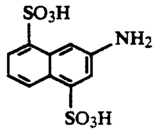 | 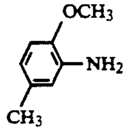 | 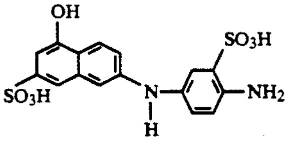 |
| 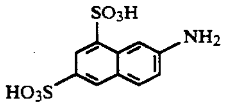 | 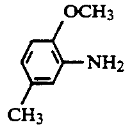 | 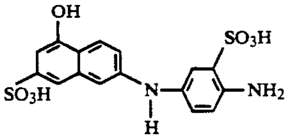 |
| 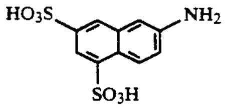 | 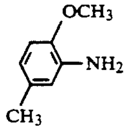 | 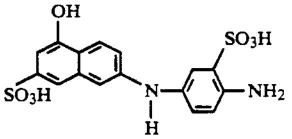 |
| 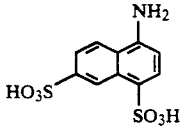 | 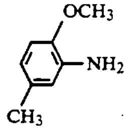 | 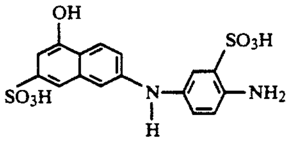 |
| 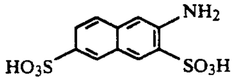 | 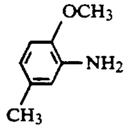 | 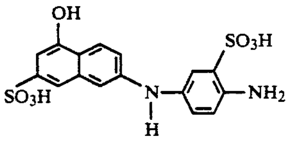 |
| 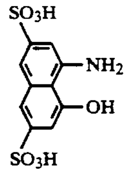 | 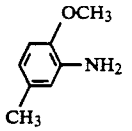 | 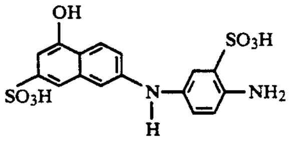 |
| 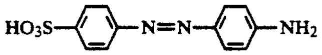 | 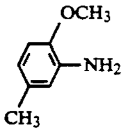 | 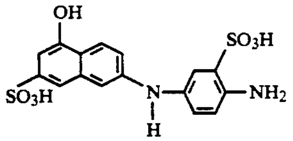 |
| 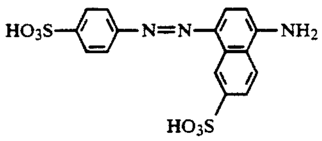 | 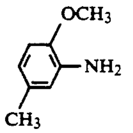 | 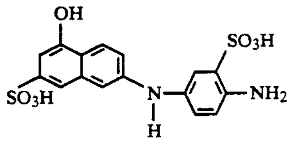 |

-continued
| Diazo component | Middle component | Coupling component |
| --- | --- | --- |
|  | 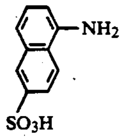 | 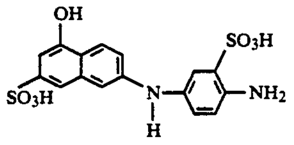 |
| 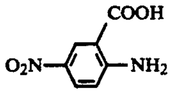 | 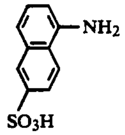 | 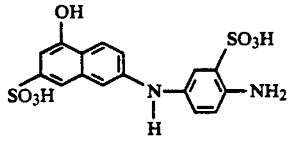 |
| 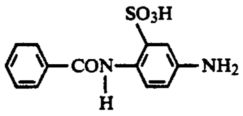 | 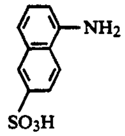 | 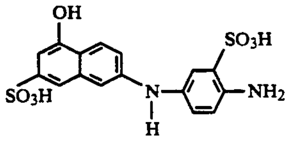 |
| 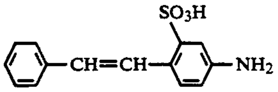 | 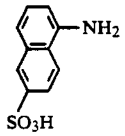 | 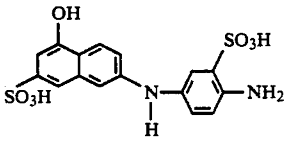 |
| 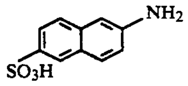 | 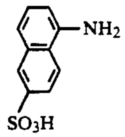 | 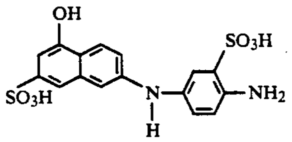 |
| 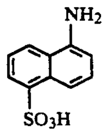 | 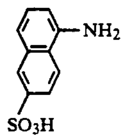 | 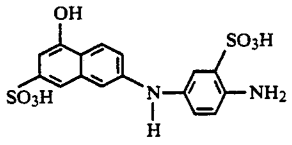 |
| 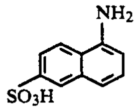 | 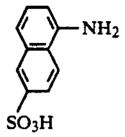 | 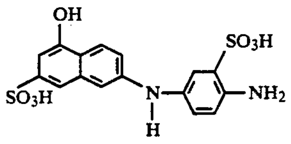 |
| 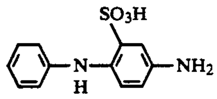 | 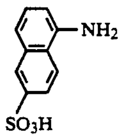 | 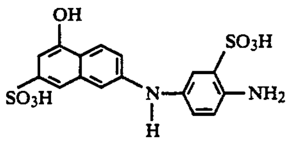 |
| 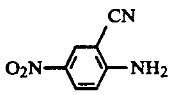 | 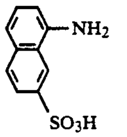 | 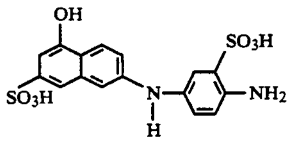 |
| 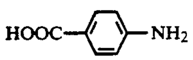 | 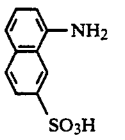 | 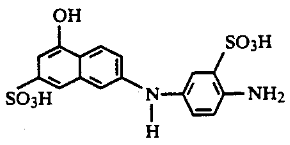 |

-continued
| Diazo component | Middle component | Coupling component |
| --- | --- | --- |
| 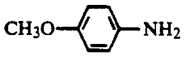 | 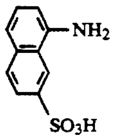 | 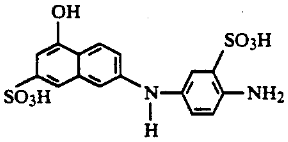 |
| 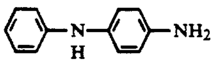 | 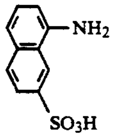 | 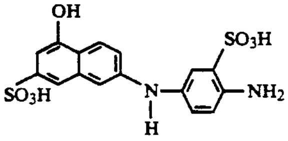 |
| 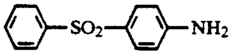 | 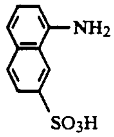 | 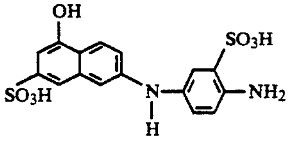 |
| 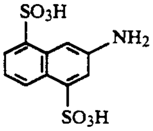 | 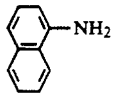 | 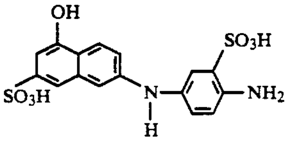 |
| 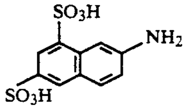 | 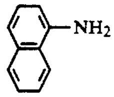 | 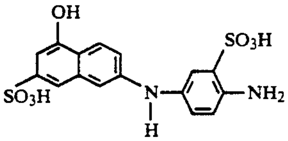 |
| 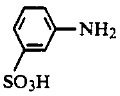 | 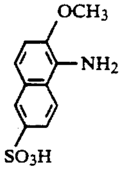 | 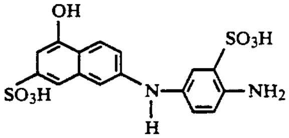 |
| 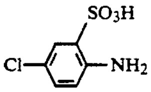 | 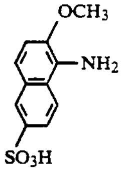 | 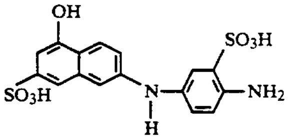 |
| 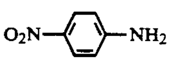 | 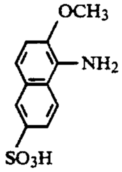 | 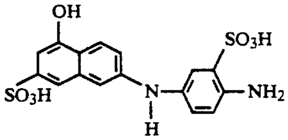 |
| 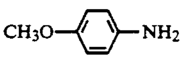 | 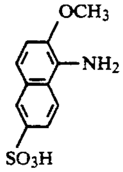 | 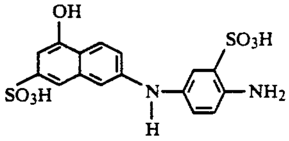 |

-continued
| Diazo component | Middle component | Coupling component |
|---|---|---|
| 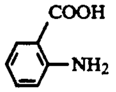 | 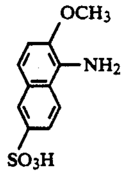 | 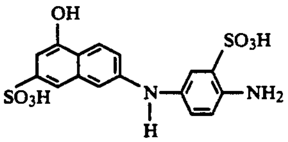 |
| 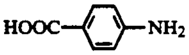 | 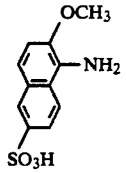 | 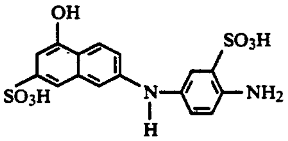 |
| 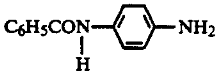 | 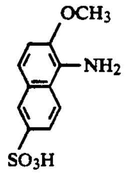 | 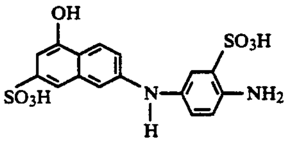 |
| 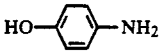 | 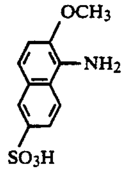 | 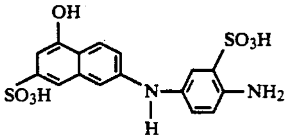 |
| 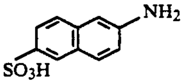 | 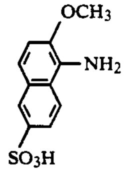 | 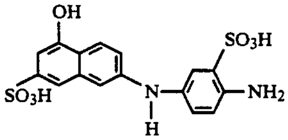 |
| 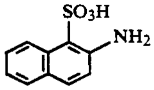 | 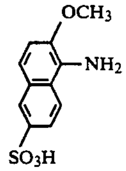 | 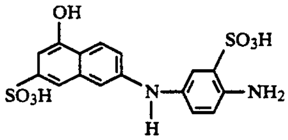 |
| 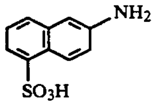 | 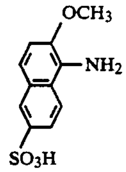 | 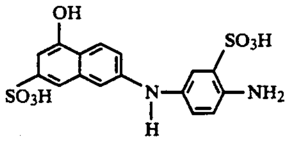 |
| 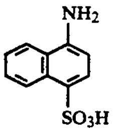 | 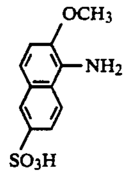 | 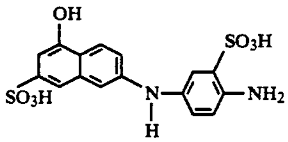 |
| 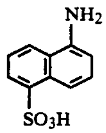 | 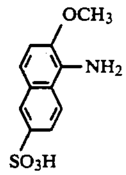 | 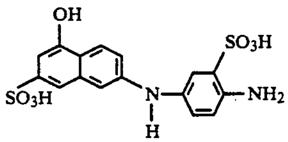 |

-continued
| Diazo component | Middle component | Coupling component |
|---|---|---|
| 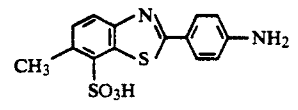 | 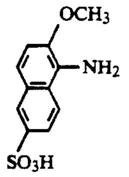 | 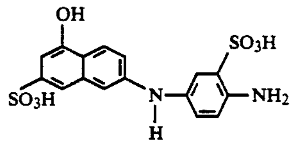 |
| 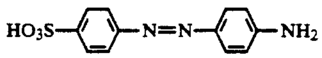 | 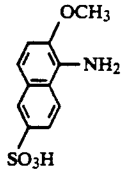 | 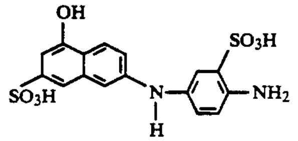 |
| 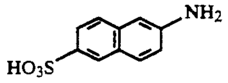 | 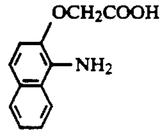 | 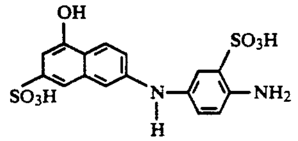 |
| 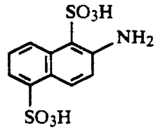 | 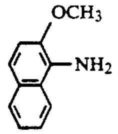 | 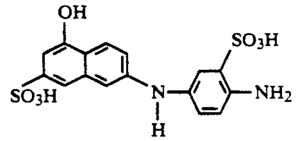 |
| 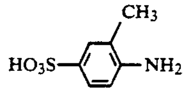 | 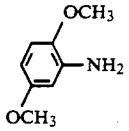 | 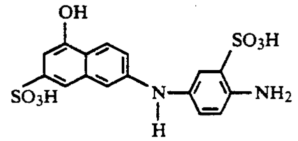 |
| 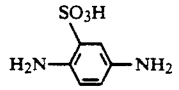 | 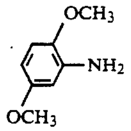 | 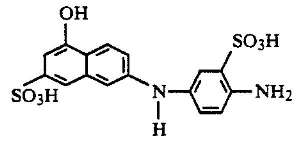 |
| 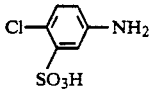 | 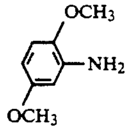 | 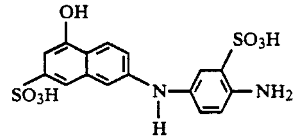 |
| 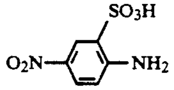 | 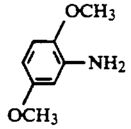 | 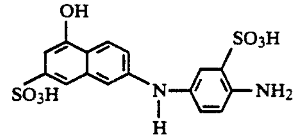 |
| 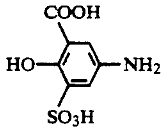 | 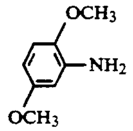 | 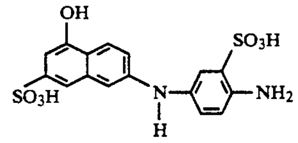 |
| 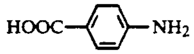 | 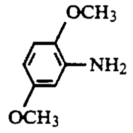 | 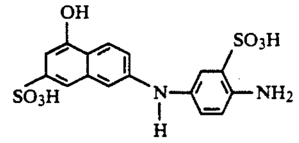 |

-continued
| Diazo component | Middle component | Coupling component |
|---|---|---|
| 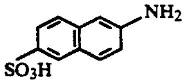 | 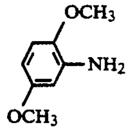 | 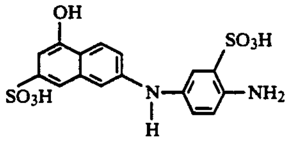 |
| 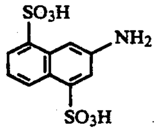 | 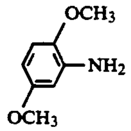 | 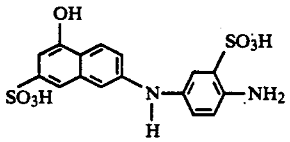 |
| 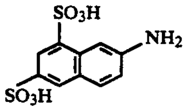 | 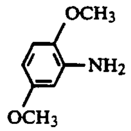 | 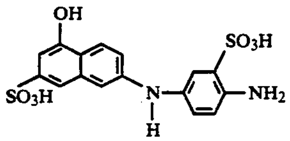 |
| 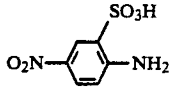 | 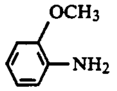 | 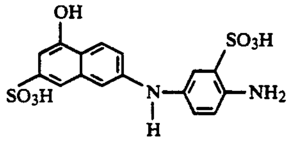 |
| 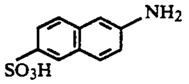 | 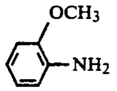 | 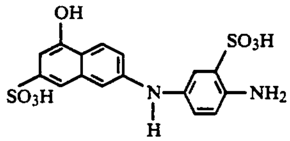 |
| 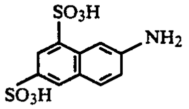 | 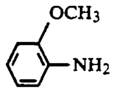 | 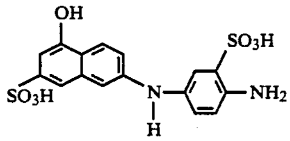 |
| 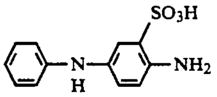 | 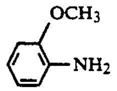 | 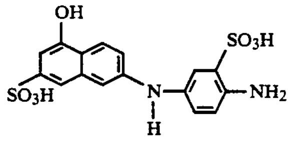 |
| 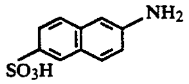 | 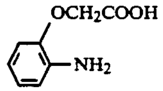 | 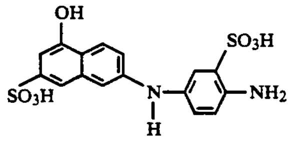 |
| 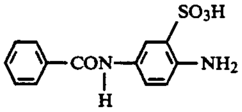 | 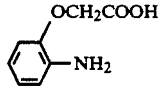 | 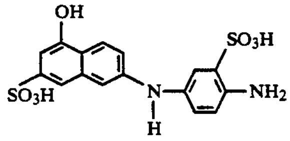 |
| 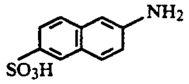 | 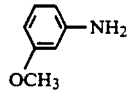 | 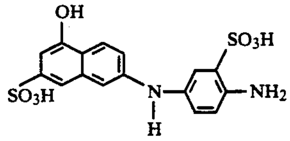 |

-continued
| Diazo component | Middle component | Coupling component |
|---|---|---|
| 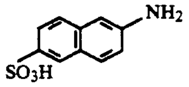 | 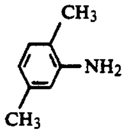 | 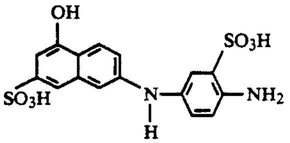 |
| 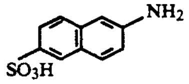 | 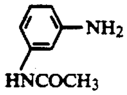 | 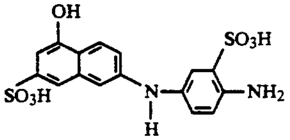 |
| 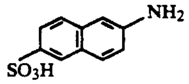 | 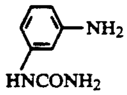 | 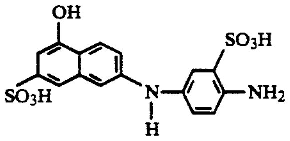 |
| 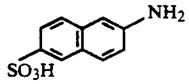 | 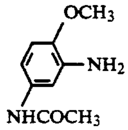 | 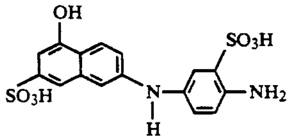 |
| 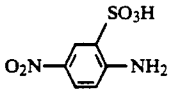 | 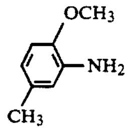 | 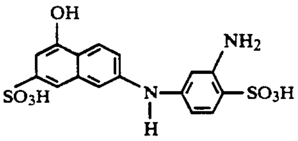 |
| 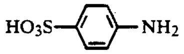 | 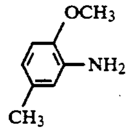 | 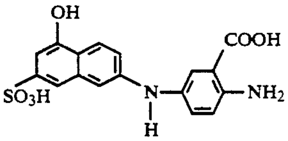 |
| 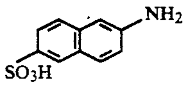 | 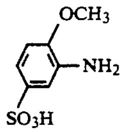 | 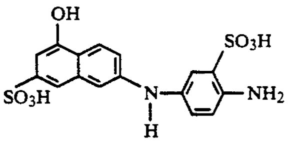 |
| 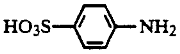 | 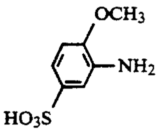 | 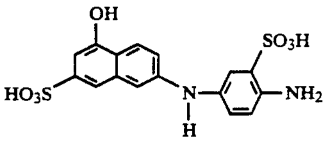 |
| 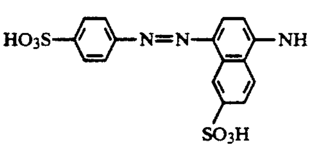 | 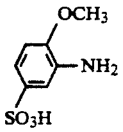 | 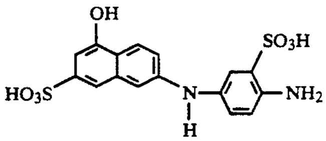 |
| 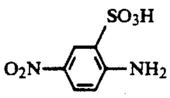 | 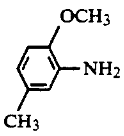 | 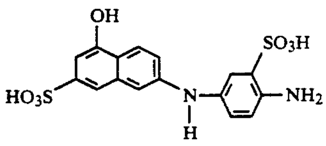 |

-continued
| Diazo component | Middle component | Coupling component |
|---|---|---|
| 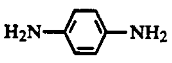 | 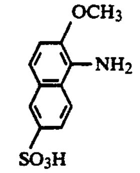 | 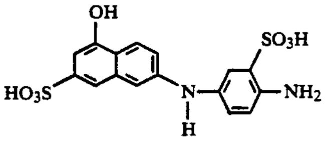 |
| 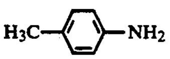 | 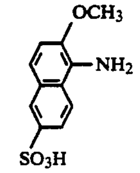 | 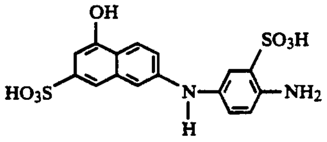 |
| 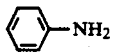 | 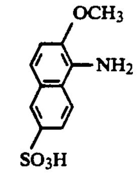 | 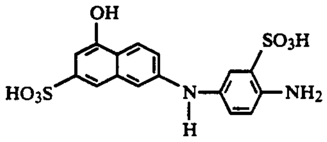 |
| 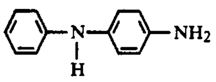 | 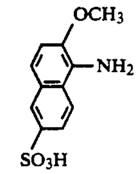 | 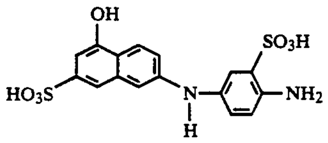 |
| 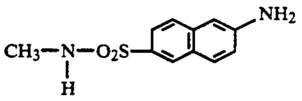 | 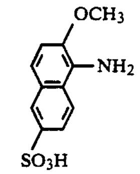 | 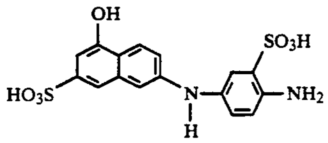 |
| 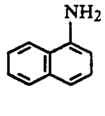 | 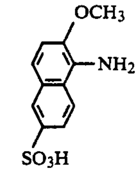 | 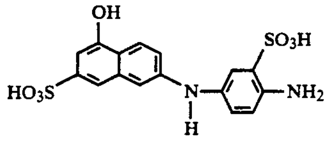 |
| 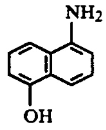 | 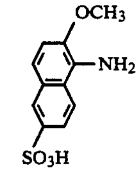 | 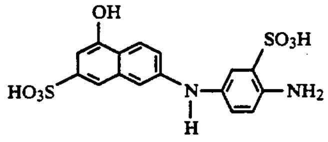 |
| 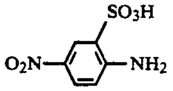 | 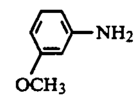 | 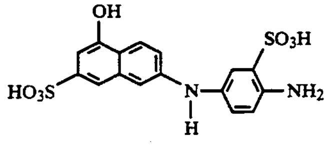 |
| 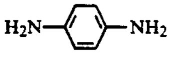 | 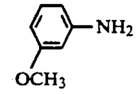 | 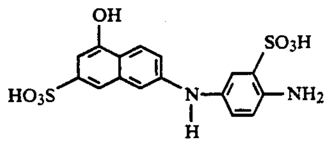 |

-continued

| Diazo component | Middle component | Coupling component |
|---|---|---|
| 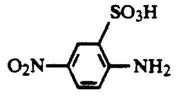 | 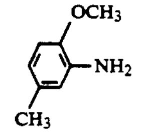 | 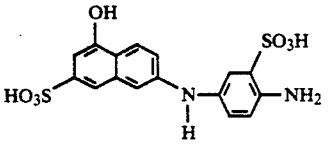 |
| 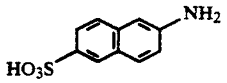 | 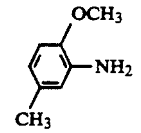 | 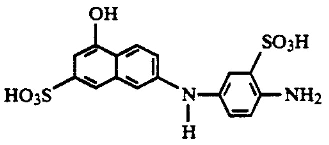 |
| 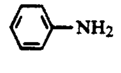 | 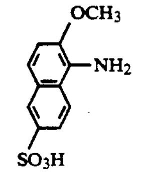 | 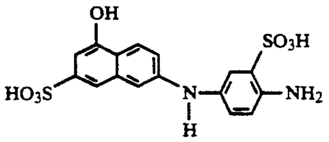 |
| 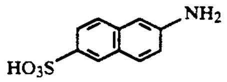 | 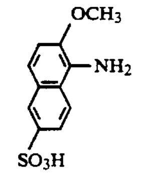 | 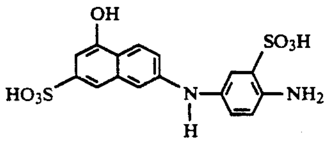 |
| 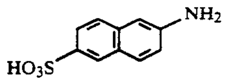 | 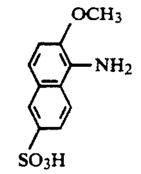 | 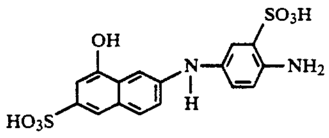 |
| 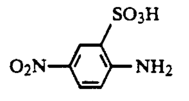 | 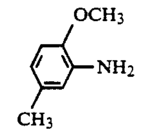 | 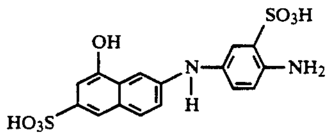 |

EXAMPLE 100

57.2 parts of the aminoazo dye prepared by coupling 2-amino-5-nitroanisole with 1-hydroxy-8-benzoylaminonaphthalene-3,6-disulfonic acid and subsequent reduction are dissolved at 75° C. in 600 ml of water to form a neutral solution, which is cooled to 0° C. After addition of 6.9 parts of sodium nitrite, the resultant suspension is immediately diazotised by addition of 25 ml of hydrochloric acid (32%) and stirred for 1 hour at room temperature.

45 parts of 2-(4'-amino-3'-sulfoanilino)-5-hydroxynaphthalene-7-sulfonic acid are dissolved in 250 parts of water with aqueous sodium hydroxide at pH 8 and the solution is cooled to 5° C. The above diazo suspension is added dropwise to this solution and the pH is kept at 8–8.5 with 4N aqueous sodium hydroxide. The reaction mixture is stirred for 1 hour at room temperature and the dye is precipitated with sodium chloride and isolated by filtration. In the form of the free acid the dye has the formula

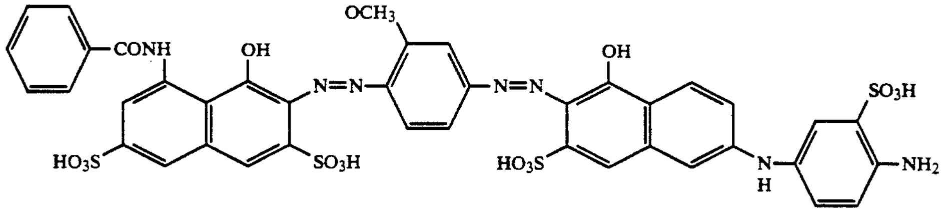

and dyes paper, cotton and leather in blue shades of good lightfastness.

EXAMPLES 101–133

In accordance with the general procedure described in Example 100, the paper dyes listed in the following Table can be prepared by diazotising the middle component and coupling to the first coupling component, then reducing the nitro group of the resultant azo dye, diazotising the aminoazo dye and coupling it to the second coupling component. If one of the coupling components contains a free amino group, said amino group is protected before coupling in known manner, typically by acylation, and, after the coupling, the protective group is removed again.

Instead of using the aminonitro compound as middle component, it is also possible to use the corresponding aminoacylamino compounds and, after the first coupling, to convert the acylamino group into the amino group.

The dyes listed in the following Table dye paper, cotton and leather in blue shades of good lightfastness.

| | 1st Coupling component | Middle component | 2nd Coupling component |
|---|---|---|---|
| 101 | 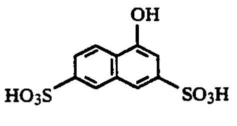 | 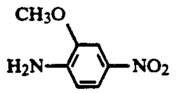 | 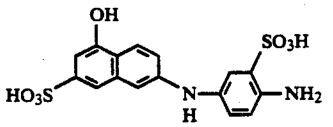 |
| 102 | 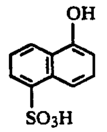 | 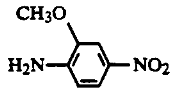 | 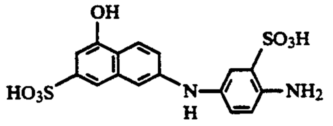 |
| 103 | 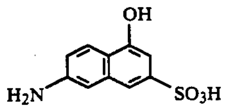 | 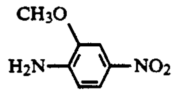 | 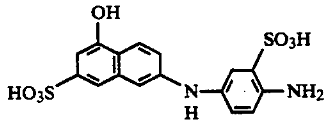 |
| 104 | 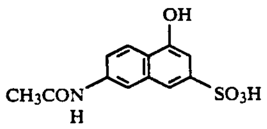 | 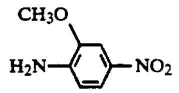 | 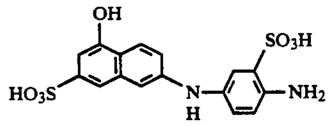 |
| 105 | 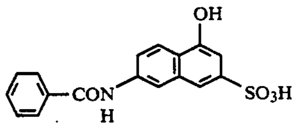 | 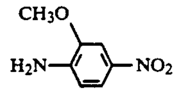 | 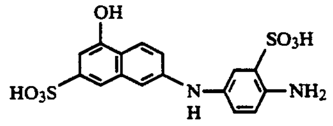 |
| 106 | 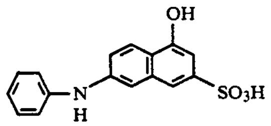 | 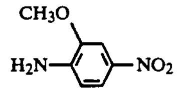 | 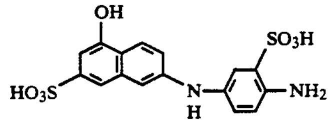 |
| 107 | 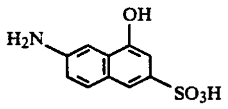 | 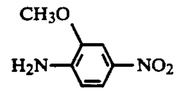 | 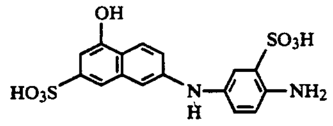 |
| 108 | 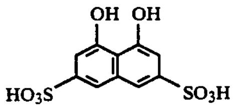 | 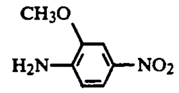 | 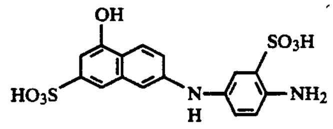 |
| 109 | 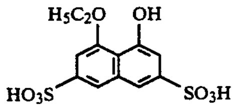 | 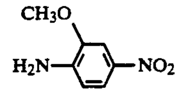 | 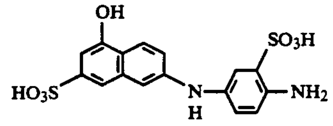 |
| 110 | 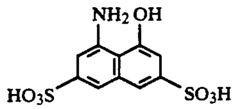 | 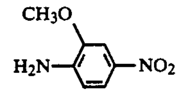 | 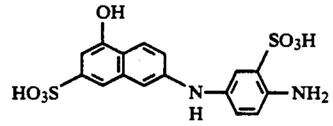 |

-continued
| | 1st Coupling component | Middle component | 2nd Coupling component |
|---|---|---|---|
| 111 | 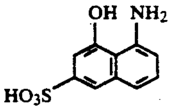 | 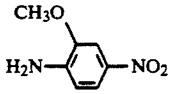 | 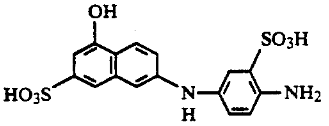 |
| 112 | 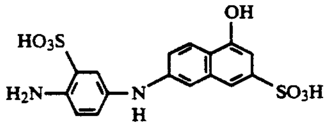 | 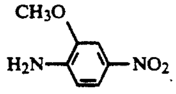 | 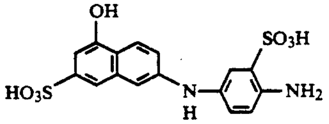 |
| 113 | 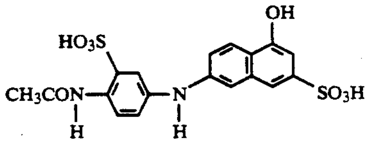 | 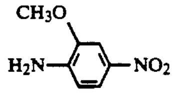 | 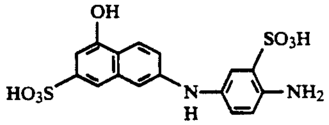 |
| 114 | 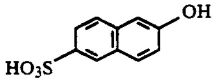 | 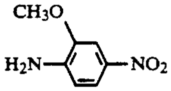 | 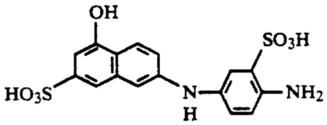 |
| 115 | 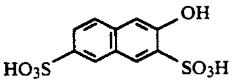 | 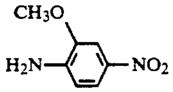 | 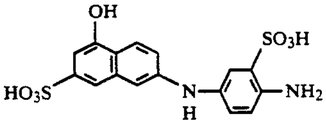 |
| 116 | 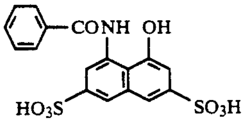 | 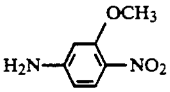 | 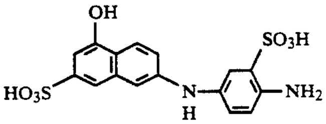 |
| 117 | 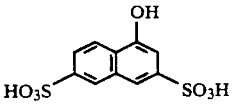 | 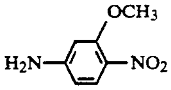 | 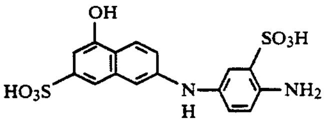 |
| 118 | 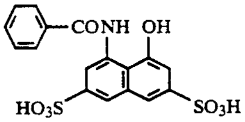 | 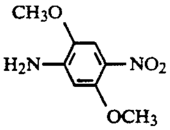 | 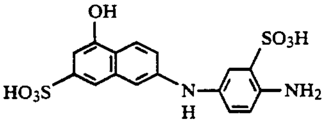 |
| 119 | 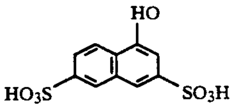 | 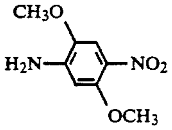 | 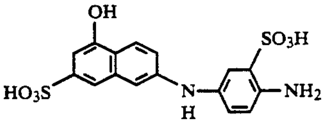 |
| 120 | 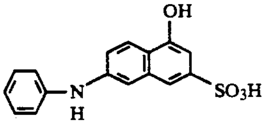 | 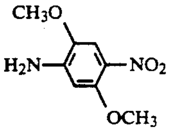 | 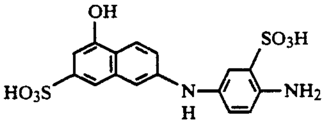 |
| 121 | 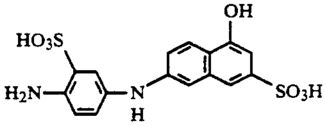 | 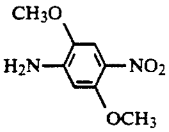 | 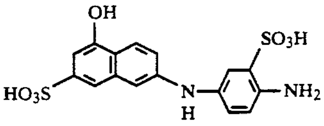 |

-continued
| | 1st Coupling component | Middle component | 2nd Coupling component |
|---|---|---|---|
| 122 | 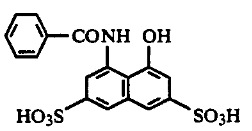 | 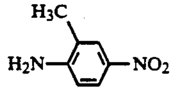 | 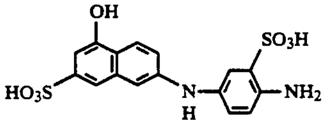 |
| 123 | 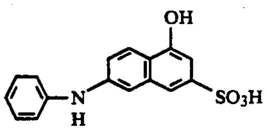 | 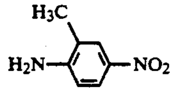 | 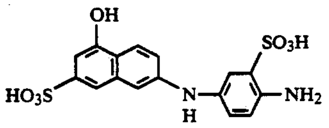 |
| 124 | 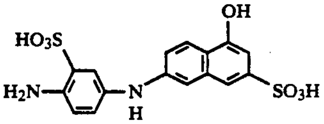 | 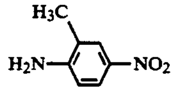 | 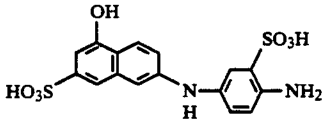 |
| 125 |  | 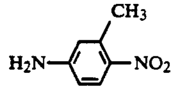 | 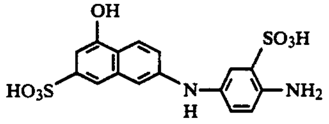 |
| 126 | 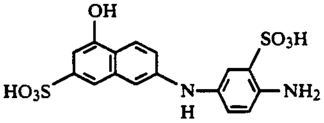 | 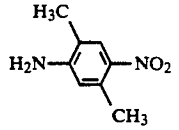 | 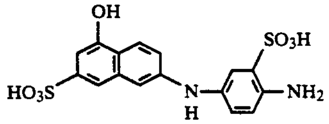 |
| 127 | 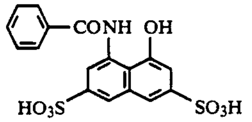 | 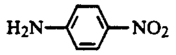 | 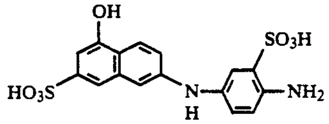 |
| 128 | 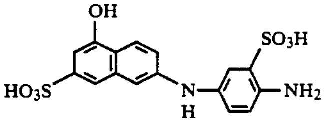 | 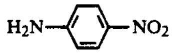 | 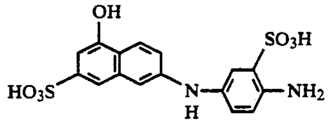 |
| 129 | 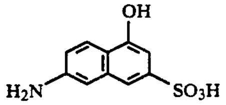 | 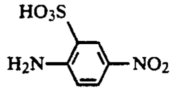 | 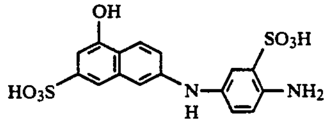 |
| 130 | 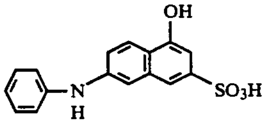 | 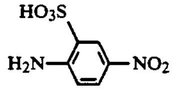 | 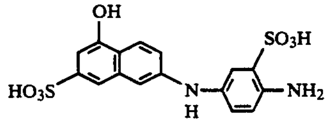 |
| 131 | 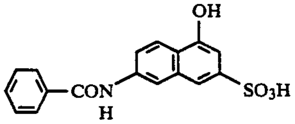 | 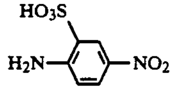 | 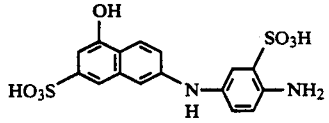 |
| 132 | 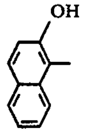 | 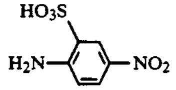 | 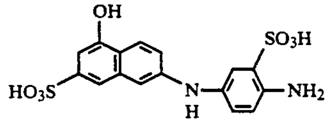 |

-continued

| | 1st Coupling component | Middle component | 2nd Coupling component |
|---|---|---|---|
| 133 | 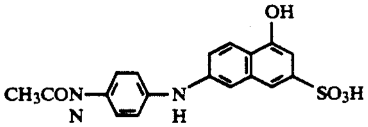 | 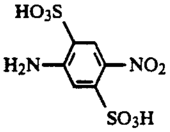 | 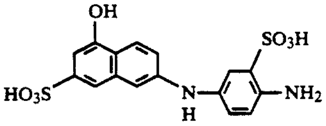 |

EXAMPLE 134

51.4 parts of the monoazo dye obtained by coupling 2-amino-5-acetaminobenzenesulfonic acid in acid medium with 2-anilino-5-hydroxynaphthalene-7-sulfonic acid and subsequent removal of the acetyl group are dissolved to form a neutral solution in 500 parts of water. After addition of 6.9 parts of sodium nitrite, the solution is cooled to 10° C. and run into a mixture of 25 parts of hydrochloric acid (32%) and 50 parts of ice-water while keeping the temperature at 5°-10° C. The reaction mass is stirred for 1 hour and then run into a neutral solution of 45 parts of 2-(4'-amino-3'-sulfoanilino)-5-hydroxynaphthalene-7-sulfonic acid in 250 parts of water. The pH is kept at 8-8.5 with 4N aqueous sodium hydroxide. After stirring for 1 hour at room temperature the dye is precipitated with sodium chloride and isolated by filtration. In the form of the free acid the dye has the formula

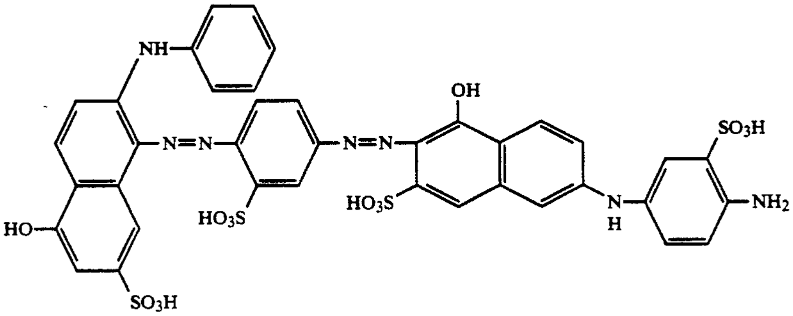

and dyes paper in blue shades of good wetfastness properties.

EXAMPLE 135-146

In accordance with the general procedure described in Examples 134, the dyes listed in the following Table can be prepared. They also dye paper in blue shades.

| | 1st Coupling component | Middle component | 2nd Coupling component |
|---|---|---|---|
| 135 | 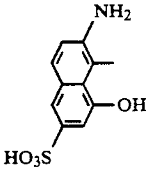 | 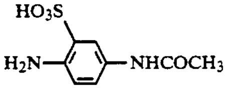 | 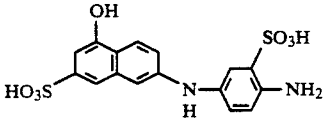 |
| 136 | 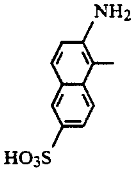 | 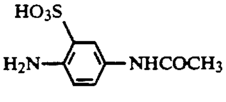 | 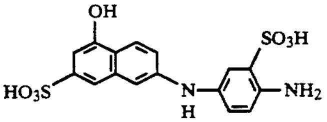 |
| 137 | 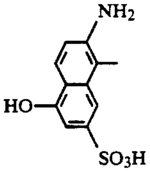 | 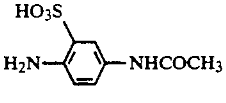 | 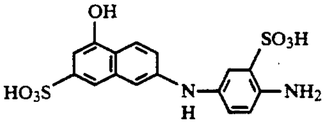 |
| 138 | 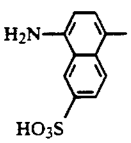 | 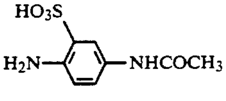 | 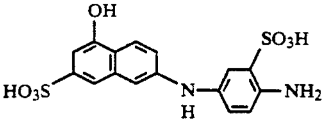 |

-continued

| | 1st Coupling component | Middle component | 2nd Coupling component |
|---|---|---|---|
| 139 | 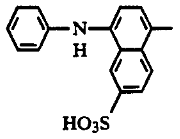 | 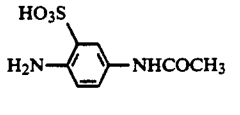 | 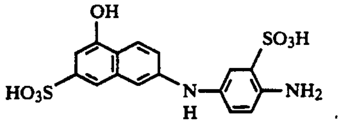 |
| 140 | 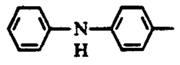 | 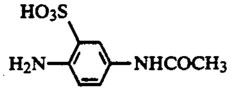 | 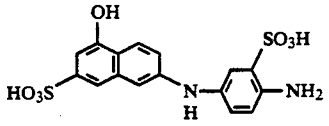 |
| 141 | 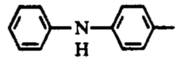 | 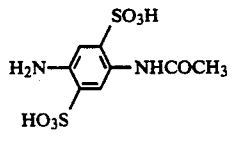 | 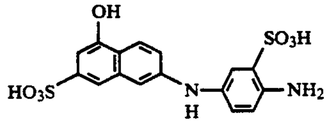 |
| 142 | 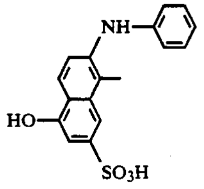 | 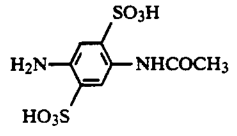 | 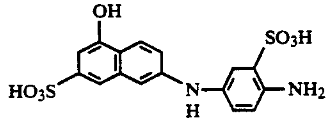 |
| 143 | 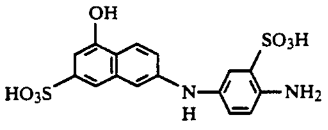 | 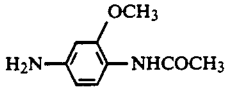 | 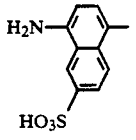 |
| 144 | 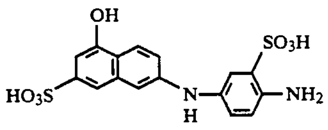 | 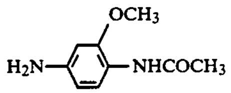 | 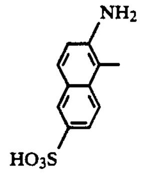 |
| 145 | 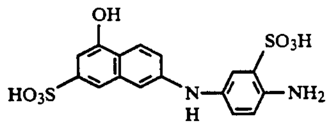 | 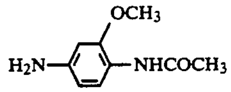 | 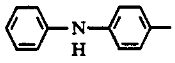 |
| 146 | 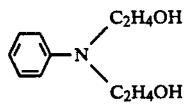 | 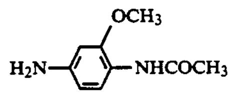 | 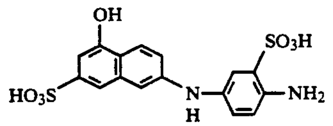 |

EXAMPLE 147

57.7 parts of the nitroazo dye prepared by coupling 2-(4'-amino-3'-sulfoanilino)-5-hydroxynaphthalene-7-sulfonic acid with 2-methoxy-4-nitroaniline are dissolved in 400 parts of water at 40° and to the solution are added 32 parts of sodium hydroxide. A solution of 10 parts of glucose in 50 parts of water are added dropwise at 55° C. over 1 hour. When no more educt is detectable, the reaction mixture is neutralised with 70 parts of hydrochloric acid (32%), and the dye is salted out and isolated by filtration at room temperature. The dye has the formula

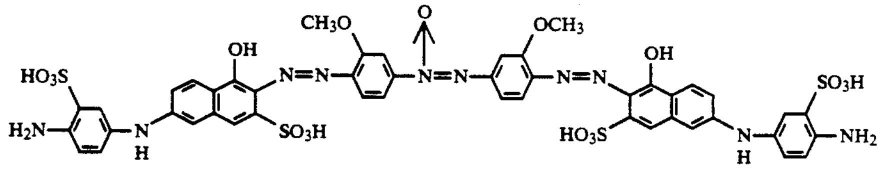

and dyes paper, cotton and leather in reddish blue shades of good lightfastness.

EXAMPLES 148-151

Replacement of the nitro compound used in Example 147 with equimolar amounts of 2,5-dimethoxy-4-nitroaniline, 2-methyl-4-nitroaniline, 2,5-dimethyl-4-nitroaniline or 4-nitroaniline gives dyes which dye paper, cotton and leather in violet to reddish blue shades of good lightfastness.

EXAMPLE 152

A solution of the coupling component is prepared by dissolving 90 parts of 2-(4'-amino-3'-sulfoanilino)-5-hydroxynaphthalene-7-sulfonic acid in the form of the sodium salt in 500 parts of water. Then 22.6 parts of 4,4'-diamino-2-methylazobenzene are diazotised in 250 parts of water and 55 parts of hydrochloric acid (32%) by addition of 52 parts by volume of a 4N solution of sodium nitrite at 0°-5° C., and the diazo solution is added dropwise to the above solution of the coupling component. The pH is kept at 8-9 and the temperature at 0°-5° C. The dye is salted out by addition of sodium chloride and isolated. It dyes paper, cotton and leather in reddish blue shades of good lightfastness, and in the form of the free acid has the formula

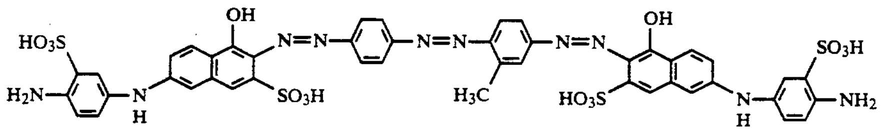

EXAMPLES 153-159

Replacement of the tetrazo component of Example 152 with equimolar amounts of 4,4'-diaminostilbene, 4,4'-diamino-2-methoxyazobenzene, 4,4'-diamino-3-methoxyazobenzene, 4,4'-diaminodiphenylamine, 4,4'-diaminobenzanilide, 4,4'-diaminodiphenylurea or a diamine of the following structure

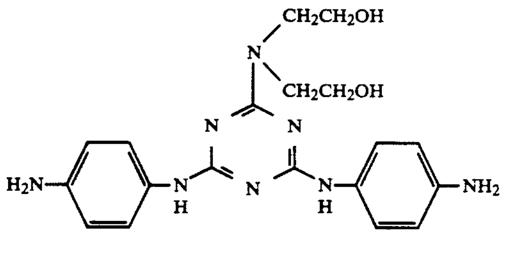

gives dyes which also dye paper in violet to reddish blue shades of good lightfastness.

EXAMPLE 160

200 parts of the dye of Example 1 in the form of the free acid of low salt content are homogenised by stirring in 500 parts of water and dissolved at 40° C. by addition of 75 parts of diethanolamine and 100 parts of urea. The solution is clarified by filtration by addition of a filter aid. The filtrate is cooled to room temperature and bulked to 1000 parts with water, giving a stable dye solution in the form of a liquid physical form.

Instead of diethanolamine it is also possible to use monoethanolamine, triethanolamine, 2-(2-aminoethoxy)ethanol, the polyglycol amines disclosed in DE-A-2 061 760, ammonia, tetramethylammonium hydroxide, lithium hydroxide or lithium carbonate.

Liquid physical forms of further dyes can be obtained as described in Example 160 by using one of the dyes of Examples 2 to 159 instead of the dye of Example 1.

EXAMPLE 161

70 parts of chemically bleached softwood sulfite pulp and 30 parts of chemically bleached birchwood sulfite pulp are beaten in 2000 parts of water in a hollander. To this pulp are added 2.5 parts of the dye solution described in Example 160. After mixing for 20 minutes, paper is manufactured from this pulp. The absorbent paper so obtained is dyed blue. The effluent is almost colourless.

EXAMPLE 162

0.5 part of the dye powder of Example 1 is dissolved in 100 parts of hot water and the solution is cooled to room temperature. This solution is added to 100 parts of chemically bleached sulfite pulp which has been beaten in 2000 parts of water in a hollander. After mixing thoroughly for 15 minutes, sizing is effected in conventional manner with rosin size and aluminium sulfate. Paper manufactured from this pulp is dyed in a blue shade of good wetfastness properties.

EXAMPLE 163

97 g of the sodium salt of the dye obtained according to Example 1 are stirred in 600 ml of water and then 160 ml of nitrobenzene, 81.4 g of tributylamine and 44 ml of 32% HCl are added at 50° C. The mixture is stirred at 40° C. until the dye has transferred completely to the organic phase. The aqueous phase is discarded and the organic phase is washed with two 600 ml portions of hot water. Then 300 ml of water and 80.0 g of triethanolamine are added and the mixture is stirred at 85° C. until the dye has transferred completely to the aqueous phase. The aqueous phase is freed from traces of nitrobenzene and tributylamine by steam distillation. A stable dye solution is obtained. The organic phase is used direct for further extractions.

What is claimed is:

1. A process for the dyeing of paper, which comprises dyeing the paper with a dye of formula

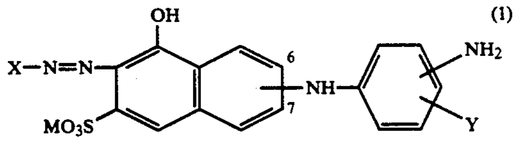
(1)

wherein
Y is sulfo or carboxy, and
X is a group of formula

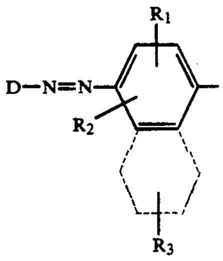
(2)

or

KK—N=N—B— (3)

wherein
D is the radical of an aromatic, carbocyclic or heterocyclic diazo component,
KK is a coupling component,
B is the radical of an aromatic diamine,
$R_1$ is hydrogen, $C_1$-$C_4$alkyl or $C_1$-$C_4$alkoxy, —NH—CO—$C_1$-$C_4$alkyl or —NH—CO—$NH_2$,
$R_2$ is hydrogen, $C_1$-$C_4$alkyl or $C_1$-$C_4$alkoxy, sulfo or carboxy,
$R_3$ is hydrogen, $C_1$-$C_4$alkyl, sulfo or carboxy, and
M is hydrogen or the equivalent of a colourless cation, and Y and the free amino group at the phenylamino radical in formula (1) are ortho-positioned to each other, and said phenylamino radical is in 6- or 7-position, and with the proviso that D is not the radical of 4-nitro-4'-aminostilbene-2,2'-disulfonic acid or 4,4'-diaminostilbene-2,2'-disulfonic acid.

2. A process according to claim 1, which comprises dyeing the paper with a dye of formula (1), wherein Y is sulfo and the free amino group is in para-position to the —NH— group.

3. A process according to claim 1, which comprises dyeing the paper with a dye of formula (1), wherein D is an unsubstituted phenyl radical or a phenyl radical which is substituted by sulfo, carboxy, chloro, cyano, hydroxy, nitro, $C_1$-$C_4$alkyl or $C_1$-$C_4$alkoxy, phenylamino, phenylsulfonyl, phenylazo, phenylcarbonylamino or styryl, or is an unsubstituted naphthyl radical or a naphthyl radical which is substituted by sulfo, hydroxy or phenylazo, the phenyl moieties of which substituents are unsubstituted or substituted by sulfo.

4. A process according to claim 1, which comprises dyeing the paper with a dye of formula (1), wherein X is a group of formula

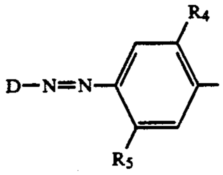
(4)

or

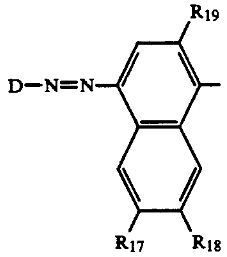
(4a)

wherein
D is a phenyl radical which is substituted by sulfo, carboxy, chloro, cyano, hydroxy, nitro, $C_1$-$C_4$alkyl or $C_1$-$C_4$alkoxy, phenylamino, phenylsulfonyl, phenylazo, phenylcarbonylamino or styryl, or is a naphthyl radical which is substituted by sulfo, hydroxy or phenylazo, the phenyl moieties of which substituents are unsubstituted or substituted by sulfo,
$R_4$ is hydrogen, methyl or methoxy,
$R_5$ is hydrogen, methyl, methoxy or acetylamino,
$R_{17}$ and $R_{18}$ are each independently of the other hydrogen or sulfo, and
$R_{19}$ is hydrogen, methoxy or carboxymethoxy.

5. A process according to claim 1, which comprises dyeing the paper with a dye of formula (1), wherein X is a group of formula

KK—N=N—B— (3)

wherein KK is a coupling component of formula

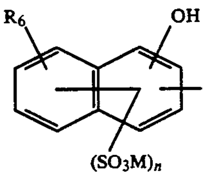
(5)

or

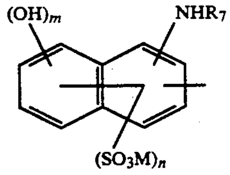
(6)

wherein
$R_6$ is hydrogen, hydroxy, alkoxy, amino, alkanoylamino, phenylcarbonylamino or phenylamino, the phenyl moieties of which two last mentioned radicals may be substituted by sulfo, amino or alkanoylamino,
n is 1 or 2,
$R_7$ is hydrogen or phenylamino, M is hydrogen or the equivalent of a colourless cation, and m is 0 or 1, and B is the radical of a phenylenediamine of formula

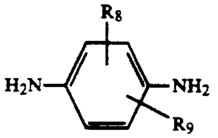

(7)

or of a diamine of formula

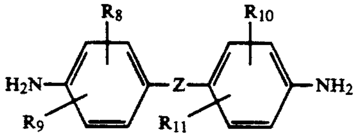

(8)

wherein $R_8$, $R_9$, $R_{10}$ and $R_{11}$ are each independently of one another hydrogen, $C_1$-$C_4$alkyl or $C_1$-$C_4$alkoxy, sulfo or carboxy, and Z is a linking group of formula —N=N—,

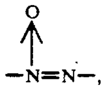

—CH=CH—, —NH—, —CO—NH—, —NH—CO—NH— or

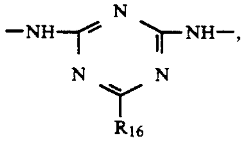

wherein $R_{16}$ is

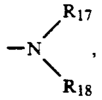

and $R_{17}$ and $R_{18}$ are each independently of the other unsubstituted or substituted $C_1$-$C_6$alkyl.

6. A process according to claim 5, which comprises dyeing the paper with a dye, wherein Z is —CH=CH— or

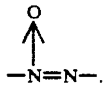

7. A process according to claim 1, which comprises dyeing the paper with a dye of formula (1), wherein M is $Na^{\oplus}$, $Li^{\oplus}$ or protonated $C_4$-$C_6$alkanolamine.

8. A process according to claim 1, which comprises dyeing the paper with a dye of formula

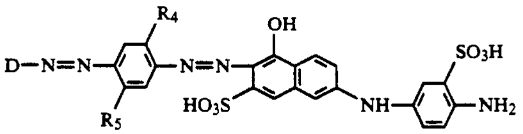

(9)

wherein

D is a phenyl radical which is substituted by sulfo, carboxy, chloro, cyano, hydroxy, nitro, $C_1$-$C_4$alkyl or $C_1$-$C_4$alkoxy, phenylamino, phenylsulfonyl, phenylazo, phenylcarbonylamino or styryl, or is a naphthyl radical which is substituted by sulfo, hydroxy or phenylazo, the phenyl moieties of which substituents are unsubstituted or substituted by sulfo, and $R_4$ is hydrogen, methyl or methoxy, and $R_5$ is hydrogen, methyl, methoxy or acetylamino.

9. A process according to claim 1, which comprises dyeing the paper with a dye of formula

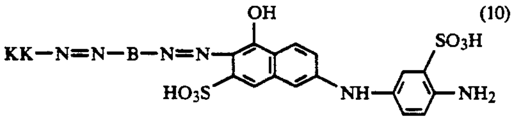

(10)

wherein

KK is a coupling component of formula

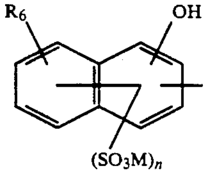

(5)

or

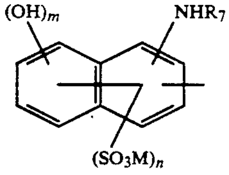

(6)

wherein $R_6$ is hydrogen, hydroxy, alkoxy, amino, alkanoylamino, phenylcarbonylamino or phenylamino, the phenyl moieties of which substituents may be substituted by sulfo, amino or alkanoylamino, n is 1 or 2, $R_7$ is hydrogen or phenylamino, M is hydrogen or the equivalent of a colourless cation, and m is 0 or 1, and B is the radical of a phenylenediamine of formula

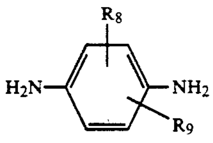

(7)

or of a diamine of formula

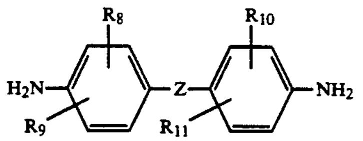 (8)

wherein $R_8$, $R_9$, $R_{10}$ and $R_{11}$ are each independently of one another hydrogen, $C_1$-$C_4$alkyl or $C_1$-$C_4$alkoxy, sulfo or carboxy, and Z is a linking group of formula —N=N—,

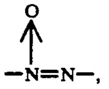

—CH=CH—, —NH—, —CO—NH—, —NH—CO—NH— or

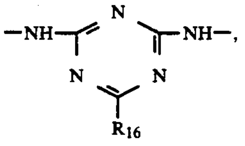

wherein $R_{16}$ is

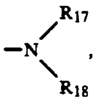

and $R_{17}$ and $R_{18}$ are each independently of the other unsubstituted or substituted $C_1$-$C_4$alkyl.

10. A process for the dyeing paper according to claim 1, wherein a dye of formula (I) is present in a concentrated aqueous solution which contains 10 to 30% by weight of said dye, based on the total weight of said solution.

* * * * *